United States Patent
Mouille

(10) Patent No.: US 8,166,685 B2
(45) Date of Patent: May 1, 2012

(54) IDENTIFYING ANIMALS

(75) Inventor: Stephane Mouille, Bonneville (FR)

(73) Assignee: Illinois Tool Works Inc., Glenview, IL (US)

( * ) Notice: Subject to any disclaimer, the term of this patent is extended or adjusted under 35 U.S.C. 154(b) by 185 days.

(21) Appl. No.: 12/530,006

(22) PCT Filed: Mar. 6, 2008

(86) PCT No.: PCT/IB2008/000526
§ 371 (c)(1),
(2), (4) Date: Oct. 4, 2009

(87) PCT Pub. No.: WO2008/107784
PCT Pub. Date: Sep. 12, 2008

(65) Prior Publication Data
US 2010/0031542 A1 Feb. 11, 2010

(30) Foreign Application Priority Data
Mar. 7, 2007 (FR) ..................................... 07 01652

(51) Int. Cl.
*G09F 3/00* (2006.01)

(52) U.S. Cl. .............. 40/304; 40/633; 40/665; 119/863; 63/3.1

(58) Field of Classification Search .................... 40/300, 40/302, 303, 633, 665; 70/16, 18; 63/3.1, 63/3.2; 368/282; 119/863
See application file for complete search history.

(56) References Cited

U.S. PATENT DOCUMENTS

| | | | | |
|---|---|---|---|---|
| 146,770 A * | 1/1874 | Mersereau | ..................... | 119/856 |
| 244,312 A * | 7/1881 | Riley | ............................. | 119/863 |
| 277,785 A * | 5/1883 | Riley | ............................. | 119/863 |
| 299,816 A * | 6/1884 | Lindol | ............................. | 63/11 |
| 328,822 A * | 10/1885 | Spruce | ......................... | 24/33 P |
| 490,537 A * | 1/1893 | Bremer | .............................. | 70/51 |
| 583,796 A * | 6/1897 | Perrell | .............................. | 70/16 |
| 727,992 A * | 5/1903 | McLean | .......................... | 24/167 |
| 803,716 A * | 11/1905 | Sarles | ............................. | 24/33 P |
| 1,427,891 A * | 9/1922 | Ziegler | ........................... | 40/633 |
| 1,573,744 A * | 2/1926 | Rhines | ............................ | 40/304 |
| 3,187,399 A * | 6/1965 | Anderson | .................. | 24/579.09 |
| 3,258,887 A * | 7/1966 | Mostoller | ........................ | 52/98 |
| 3,641,984 A * | 2/1972 | Lanus | ........................... | 119/863 |
| 4,221,063 A * | 9/1980 | Charles et al. | .................. | 40/665 |

(Continued)

FOREIGN PATENT DOCUMENTS

DE 29601041 U1 5/1997

(Continued)

OTHER PUBLICATIONS

ISR for PCT/IB2008/000526 dated Oct. 10, 2008.

*Primary Examiner* — Casandra Davis

(74) *Attorney, Agent, or Firm* — Lowe Hauptman Ham & Berner LLP

(57) ABSTRACT

A identifying device for animals comprising an identifying ring comprising a laser or ink jet marker and/or an electronic transponder intended for being arranged around one of the animal's legs, characterized in that the ring comprises adjusting and latching means, comprising at least one latching stem to be engaged concurrently on the one hand, into a latching hole and on the other hand, into a retaining hole.

11 Claims, 5 Drawing Sheets

U.S. PATENT DOCUMENTS

| | | | |
|---|---|---|---|
| 4,512,096 A | 4/1985 | Heidecker | |
| 5,363,677 A * | 11/1994 | Cox | 70/18 |
| 5,448,846 A * | 9/1995 | Peterson et al. | 40/633 |
| 5,486,079 A * | 1/1996 | Martin et al. | 411/392 |
| 5,955,953 A | 9/1999 | Hanson et al. | |
| 6,792,894 B1 * | 9/2004 | Donaldson | 119/856 |

FOREIGN PATENT DOCUMENTS

| | | |
|---|---|---|
| FR | 2849744 A1 | 7/2004 |
| GB | 1111418 | 4/1968 |
| NZ | 330006 A | 9/1998 |

\* cited by examiner

IDENTIFYING ANIMALS

RELATED APPLICATIONS

The present application is based on International Application Number PCT/IB08/000526 filed Mar. 6, 2008, and claims priority from French Application Number 0701652 filed Mar. 7, 2007, the disclosures of which are hereby incorporated by reference herein in their entirety.

BACKGROUND ART

The present invention relates to an identifying device, for example for identifying animals. It relates more particularly to a identifying device for ovine, caprine, bovine or horse species.

SUMMARY OF THE INVENTION

The identifying device according to the invention is in the form of a ring, being provided to be positioned around the animal's legs, said ring comprising a visual or electronic identifying device, with the means thereof for fixing it to the animal to be identified.

Although the device according to the invention is more particularly provided for identifying animals, it could be used for identifying any other element such as, for example, luggage or golf bags, or any other object.

Animal identification, for example farmed animals for human consumption has always been a concern for man and in particular, in the industrialized countries where it is required to know the origin, the breeding location and the history of the animal, for example before being put into the consumption circuit. Such problems anyway seem more and more substantial and important nowadays and this, specially, because of the so-called "mad cow" disease.

It is therefore of the utmost importance to provide identifying devices being difficult or even impossible to falsify.

There are numerous types of identifying devices such as rings, tattoos or identification earrings. The latter are advantageously intended for being arranged on the animal, and generally comprise an ink jet or laser marker, or even an electronic token intended for identifying the animal as well as the breeding location thereof, for example.

Thus, this invention relates to an identifying device for animals comprising an identification ring comprising a laser or ink jet marker and/or an electronic transponder intended for being arranged around one of the animal's legs, the ring comprising adjusting and latching means, characterized in that the latching means comprise at least one latching stem intended to be engaged concurrently on the one hand into a latching hole and on the other hand, into a retaining hole.

Preferably, the latching stem comprises a cylindrical part comprising at one end thereof a gripping head, while a lower resistance cutting area is arranged between the head and the cylindrical part allowing the user, once the ring is arranged round the animal's leg, to break the stem at the level of the cutting area and to remove the gripping head.

Advantageously, the latching stem comprises at the engaging end thereof an egg-shaped end cone, for providing on the rear part thereof two flanges projecting relative to the cylindrical part in such a way that, after engaging, the latching stem is longitudinally held in the corresponding holes.

Still advantageously, one of the ends or first end of the strip comprises at least one transversal latching projection comprising a transversal latching hole for receiving a latching stem, whereas the end of the strip comprises at least one retaining and adjusting hole, arranged at the level of the corresponding projection, and there are provided two latching types and the transversal hole of the central projection comprises a central wall preventing any possible attempt to remove a stem through pushing on the opposite stem.

BRIEF DESCRIPTION OF THE DRAWINGS

Other characteristics and advantages of the invention will become apparent from the following description referring to appended drawings only given by way as non limitative examples.

FIG. 3 is a side view.

FIG. 4 is an end view on the engaging end side.

FIG. 5 is a perspective view.

FIG. 6 shows the device being bent before being positioned.

FIG. 7 shows the device upon the choice of the peripheral dimension and the engagement of transversal retaining projections into the retaining and adjusting holes.

FIG. 8 shows the device after a complete engagement of the latching stems.

FIG. 9 shows the device upon the separation of the gripping heads from the latching stems.

DETAILED DESCRIPTION OF THE DRAWINGS

Figure 1:
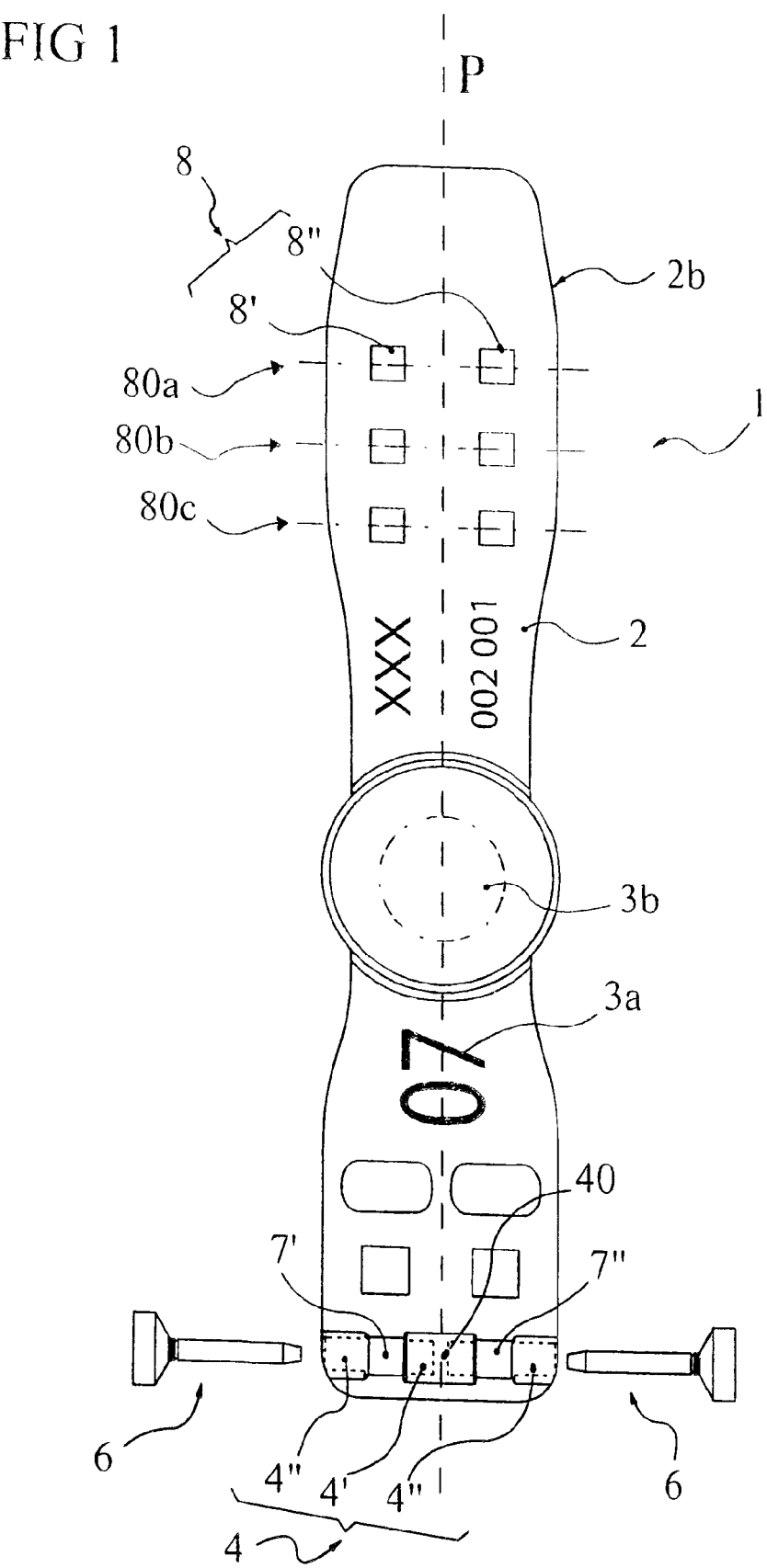
FIG. 1 shows the identifying device according to a planar view and its extended initial position.

According to the invention, the identifying device (1) comprises a wide flat strip (2) with a general symmetry plane (P) made for example in a deformable plastic material, so as to form a ring when both ends (2a, 2b) thereof are brought closer and latched.

Thus, both ends (2a, 2b) comprise complementary latching means arranged to latch together both ends and complementary adjusting means arranged to adapt the ring peripheral dimensions to the morphology of the animal being ringed.

It is to be noticed that the strip (2) comprises elements for identifying the animal, for example a laser (3a) or even an ink jet marker and/or an electronic transponder (3b). One of the ends (2a), or first end, of the strip (2) comprises at least one transversal latching projection (4) comprising a transversal latching hole (5) intended for receiving a latching stem (6). Furthermore, the end of the strip comprises at least one retaining and adjusting hole (7), the function of which will be explained later. Such a retaining and latching hole is arranged at the level of the corresponding projection.

The other end (2b), or second end, of the strip (2) comprises at least one transversal retaining projection (8) comprising a transversal retaining hole (9) for receiving the latching stem (6). It is to be noticed that the transversal retaining projection (8) is intended for being engaged into the retaining and adjusting hole (7) of the other end (2a).

The engagement of the latching stem (6) on the one hand into the transversal latching hole (5) and into the transversal retaining hole (9) provides for both ends (2a, 2b) to be fixed and latched.

It is to be noticed that the latching stem (6) being advantageously cylindrical, comprises a cylindrical part (6a) comprising at one of its ends an engaging cone (6b), and at its other end, a gripping head (6c). According to the invention, the latching stem is such that it comprises a lower resistance cutting area (6*d*) between the head (6*c*) and the cylindrical part (6*a*) allowing the user, after the ring has been positioned around the animal's leg, to break the stem at the level of the cutting area (6*d*) and to remove from the latching stem the gripping head (6*c*).

According to the preferred embodiment of the invention such as illustrated, the first end (2*a*) of the strip (2) comprises three transversal latching projections (4', 4", 4''') being transversally aligned perpendicular to the general symmetry plane (P), i.e. a central projection (4') and two side projections (4', 4'''). Between each of the side projections and the central projection, the strip respectively comprises an adjusting hole (7', 7") wherein the transversal retaining projections (8', 8") are provided to be engaged. To this end, the second end (2*b*) of the strip (2) comprises two transversal adjusting projections (8', 8") being transversally aligned perpendicular to the general symmetry plane (P) and being spaced so that the distance separating them corresponds to the length of the central projection (4') of the other end. Of course, the position of both retaining projections (8', 8") should match the position of both retaining holes (7', 7") of the other end. It is to be understood that the adjusting holes (7, 7") are arranged between the central projection (4') and the side projections (4", 4''').

It is to be noticed that the transversal hole (5) of the central projection (4') comprises a central wall (40) preventing any attempt to remove a stem through pushing on the opposite stem.

Moreover, the identifying ring comprises, as already been indicated previously, complementary adjusting means allowing for the ring peripheral dimensions to be adapted to the morphology of the animal being ringed. In this respect, the second end (2*b*) of the strip (2) comprises several successive rows of retaining projections (8). According to the exemplary embodiment, the strip comprises three successive rows of projections (80*a*, 80*b*, 80*c*). Thus, the identifying ring could have three peripheral dimensions, thereby allowing for an adaptation to numerous animals.

It is to be noticed that the end cone (6*b*) is egg-shaped so as to show on its rear part two overhanging flanges (60', 60") projecting with respect to the cylindrical part (6*a*) so that after engagement, the latching stem in the corresponding holes be longitudinally retained.

Figure 2:
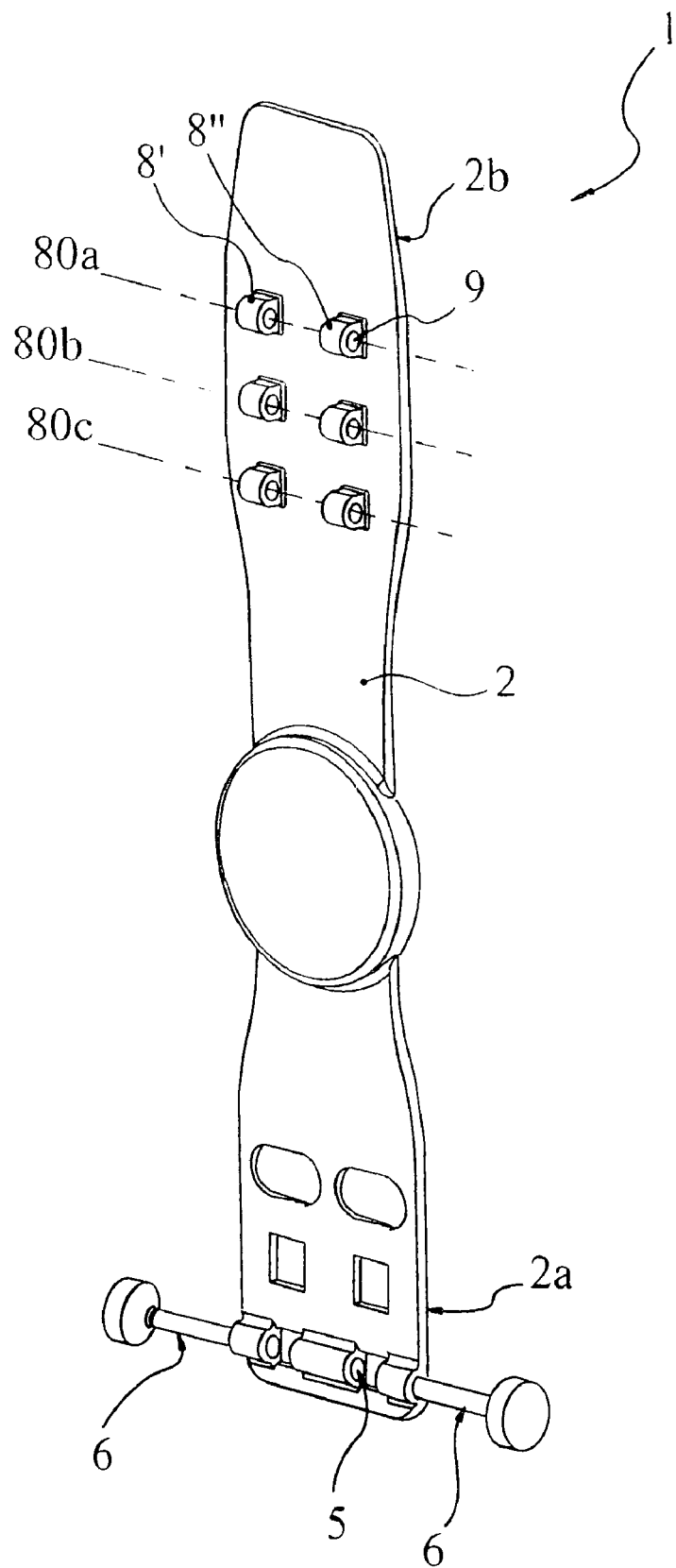
FIG. 2 shows the identifying device in a perspective view and in its engaged position.
Figure 3:
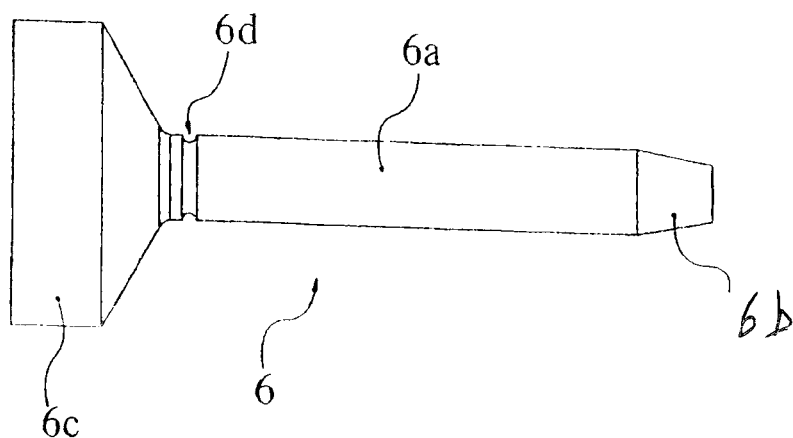
FIGS. 3, 4, 5 represent the latching stem.
Figure 4:
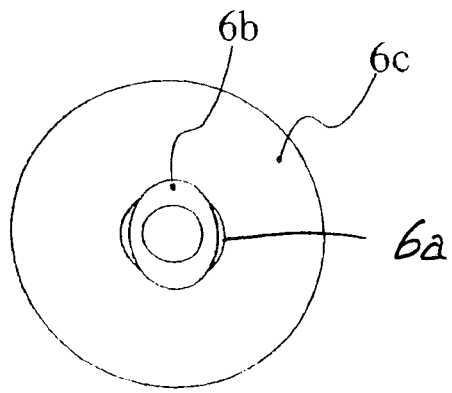
Figure 5:
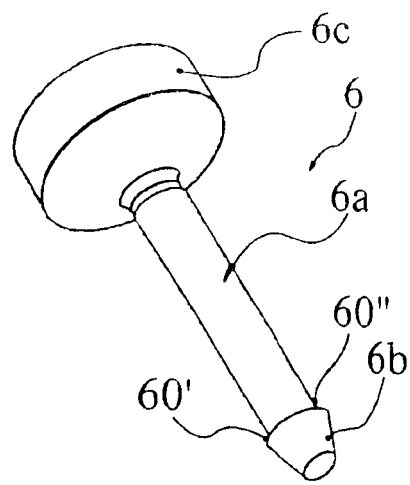
Figure 6:
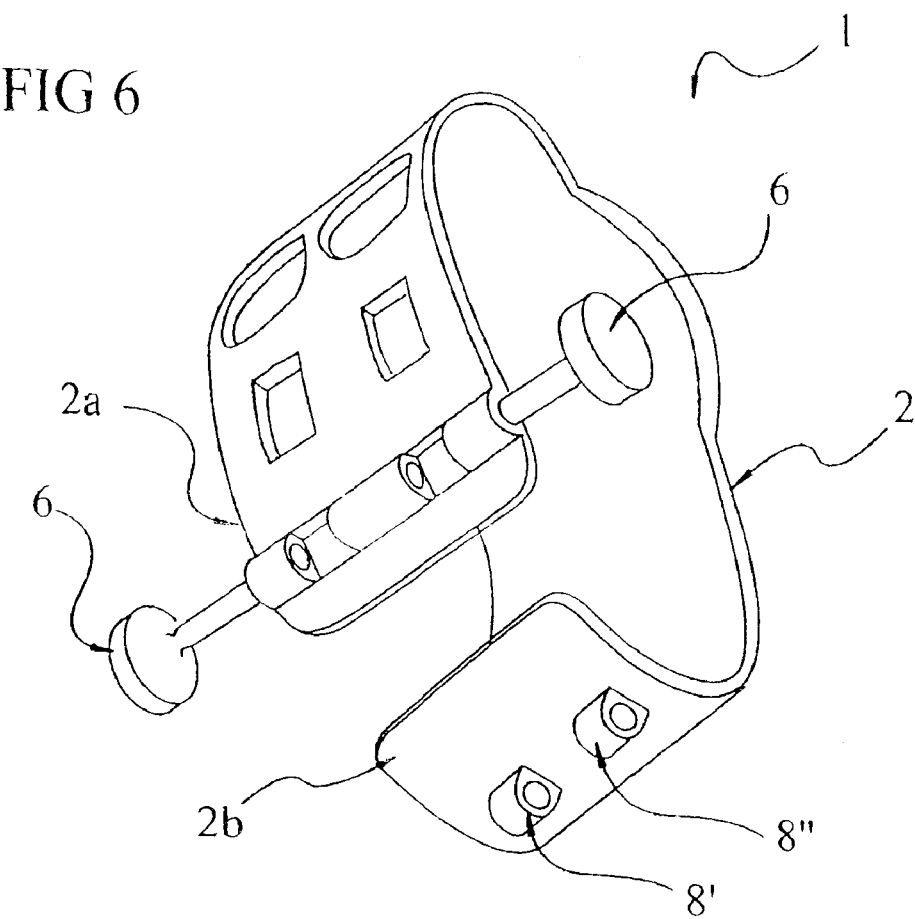
FIGS. 6 to 9 are perspective views of the method for positioning the device.
Figure 7:
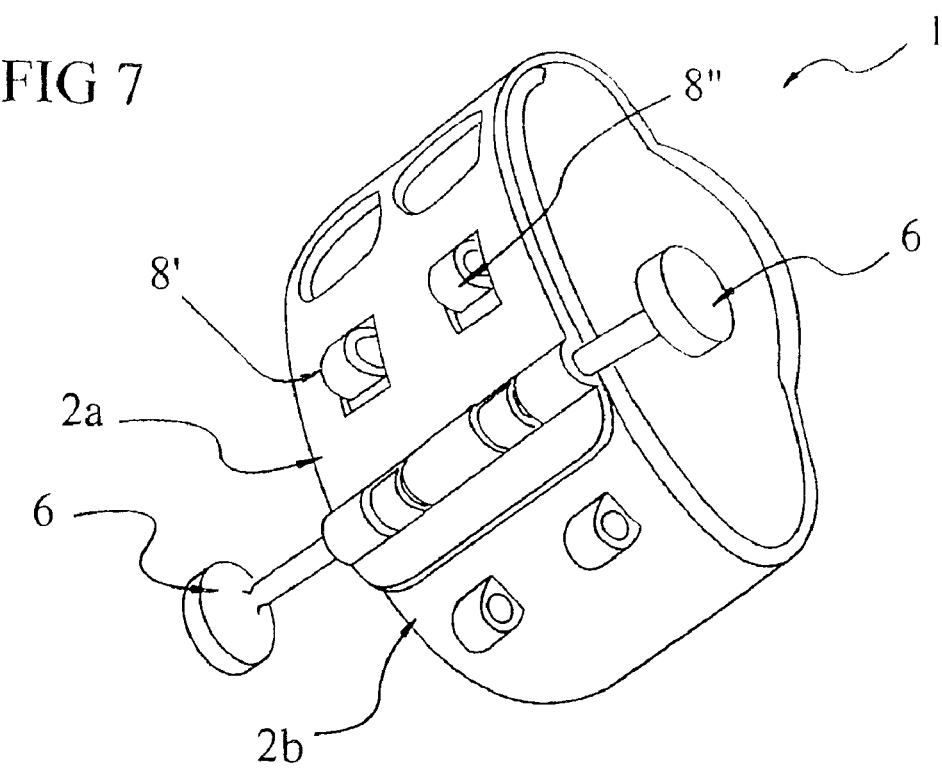

It is to be understood that according to the above-mentioned preferred embodiment, the identifying ring comprises two latching stems. Thus, after being positioned, both stems could be slightly engaged such as illustrated on FIGS. 2, 6 and 7. Then, the user surrounds the animal's leg choosing to engage into the retaining holes (7', 7") rows of retaining projections as illustrated on FIG. 7. In such a position, the latching holes (5) of the latching projections (4', 4", 4''') are aligned with the transversal retaining holes (9).

Figure 8:
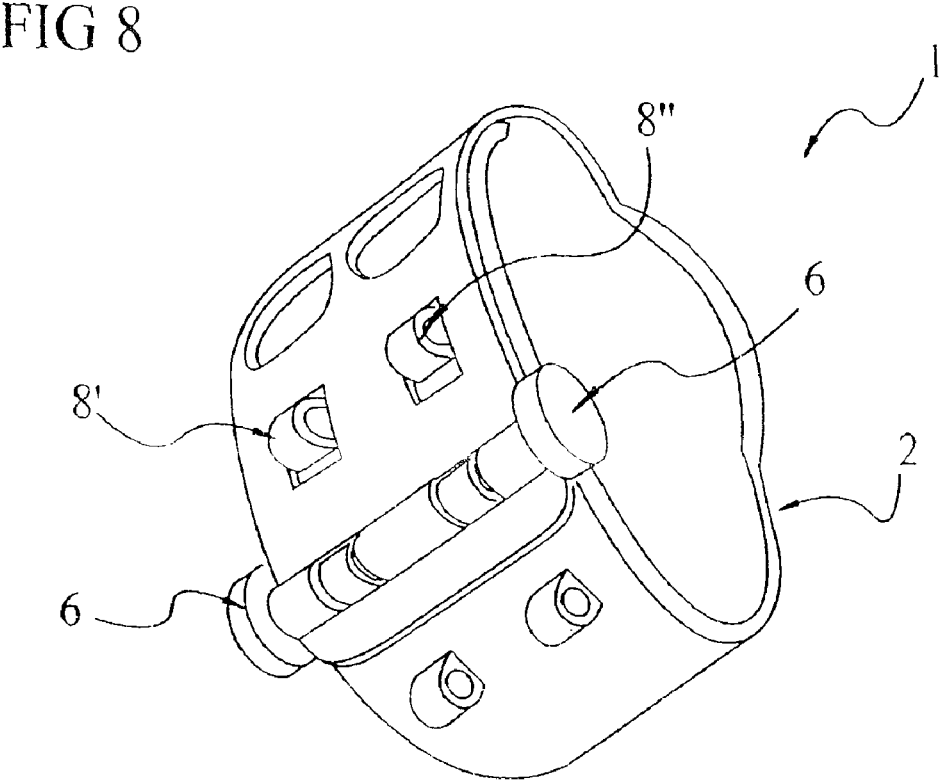
Figure 9:
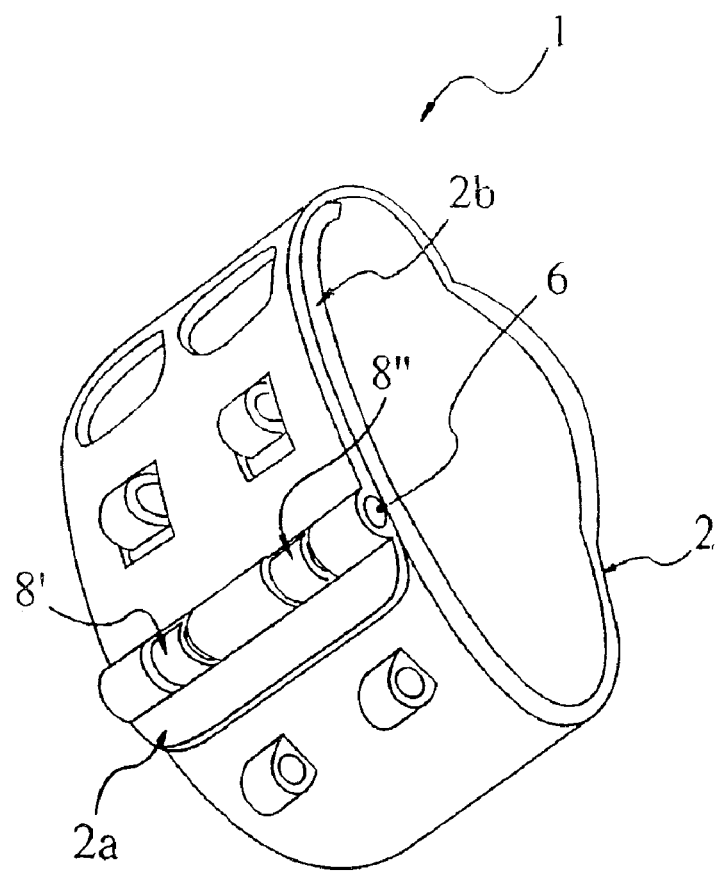

The user should only finalize the complete engagement of both latching stems as illustrated on FIG. 8, then he breaks the gripping heads (6*c*) of both latching stems (6) as shown on FIG. 9, cancelling from the device said stem gripping means and ensuring the inviolability of the identifying device, since the completely engaged latching stems do not offer any external gripping and for removing them, the falsifier should destroy the ring.

It goes without saying that the strip (2) could be made in different lengths, so that the ring should be adapted to different applications.

It is also to be noticed that by virtue of the device construction, it is possible to successively associate two devices, allowing for a better adjustment capacity.

Furthermore, it could be contemplated that retaining projections (8', 8") should be provided with a clearance such that a slight snapping occurs when such projections are introduced into the corresponding adjusting holes (7', 7"), providing for a better use comfort for introducing the stems.

Of course, this invention is not limited to the described and represented exemplary embodiments, but it also include all technical equivalents as well as the combinations thereof.

The invention claimed is:

1. An identifying device for identifying an item, said device comprising:
    an identifying ring adapted to be positioned on said item and including a latching hole and a retaining hole; and
    at least one latching stem engageable in both the latching hole and the retaining hole and breakable after the identifying ring is positioned on said item,
    wherein
    said ring is defined by a strip of deformable plastic material,
    longitudinally opposite first and second ends of the strip carry the latching hole and the retaining hole, respectively, and are adapted to be brought close to each other to align the latching hole and the retaining hole to be latched by the latching stem,
    the identifying device further comprises:
    projections at the first and second ends of the strip and having said latching hole and said retaining hole for allowing said both ends to be latched together; and
    adjusting openings at one of the first and second ends of the strip and configured for allowing insertion of the projections on the other end of the strip therein to permit peripheral dimensions of the ring to be adjusted to a size of the item to be ringed.

2. The identifying device according to claim 1, comprising two said latching stems.

3. An identifying device for identifying an animal, said device comprising:
    an identifying ring adapted to be positioned on a leg of said animal and including a latching hole and a retaining hole, said ring further carrying a marker or an electric transponder; and
    at least one latching stem engageable in both the latching hole and the retaining hole,
    wherein the latching stem comprises
        a cylindrical part;
        a gripping head at an end of the cylindrical part; and
        a lower resistance cutting area between the gripping head and the cylindrical part for allowing a user, after positioning the ring around the animal's leg, to break the latching stem at the cutting area and to remove the gripping head from the cylindrical part of the latching stem.

4. The identifying device according to claim 3, wherein the latching stem further comprises an egg-shaped end cone at an end of the cylindrical part that is opposite to the gripping head,
    wherein said egg-shaped end cone includes two overhanging flanges projecting relative to the cylindrical part such that, after engaging, the latching stem is longitudinally held in the latching hole and the retaining hole.

5. An identifying device for identifying an animal, said device comprising:
    an identifying ring adapted to be positioned on a leg of said animal and including a latching hole and a retaining hole, said ring further carrying a marker or an electric transponder; and at least one latching stem engageable in both the latching hole and the retaining hole,
wherein
said ring is defined by a strip of deformable plastic material, and
longitudinally opposite first and second ends of the strip carry the latching hole and the retaining hole, respectively, and are adapted to be brought close to each other to align the latching hole and the retaining hole to be latched by the latching stem,
said device further comprising:
projections at the first and second ends of the strip and having said latching hole and said retaining hole for allowing said both ends to be latched together; and
adjusting openings at one of the first and second ends of the strip and configured for allowing insertion of the projections on the other end of the strip therein to permit peripheral dimensions of the ring to be adjusted to a size of the animal's leg to be ringed.

6. The identifying device according to claim 5, wherein said projections include
at the first end, at least one transversal retaining projection including the retaining hole transversally arranged therein for receiving the latching stem; and
at the second end, at least one transversal latching projection including the latching hole transversally arranged therein for receiving the latching stem.

7. The identifying device according to claim 6, wherein said at least one retaining projection includes multiple retaining projections arranged in successive rows at the first end of the strip.

8. The identifying device according to claim 6, wherein said both first and second ends of the strip are retained and latched together through engaging the latching stem into the transversal latching hole and into the transversal retaining hole.

9. The identifying device according to claim 8, wherein
said at least one latching projection includes a central latching projection and two side latching projections, and
said at least one retaining projection is receivable between each of the side latching projections and the central latching projection.

10. The identifying device according to claim 9, further comprising a central wall arranged in the latching hole of the central latching projection for preventing the latching stem from being removed when another latching stem is pushed in the latching hole of the central latching projection from an opposite side.

11. The identifying device according to claim 9, wherein
said at least one retaining projection includes two transversal retaining projections, and
the central latching projection is receivable between the two transversal retaining projections.

\* \* \* \* \*